United States Patent Office 2,757,209
Patented July 31, 1956

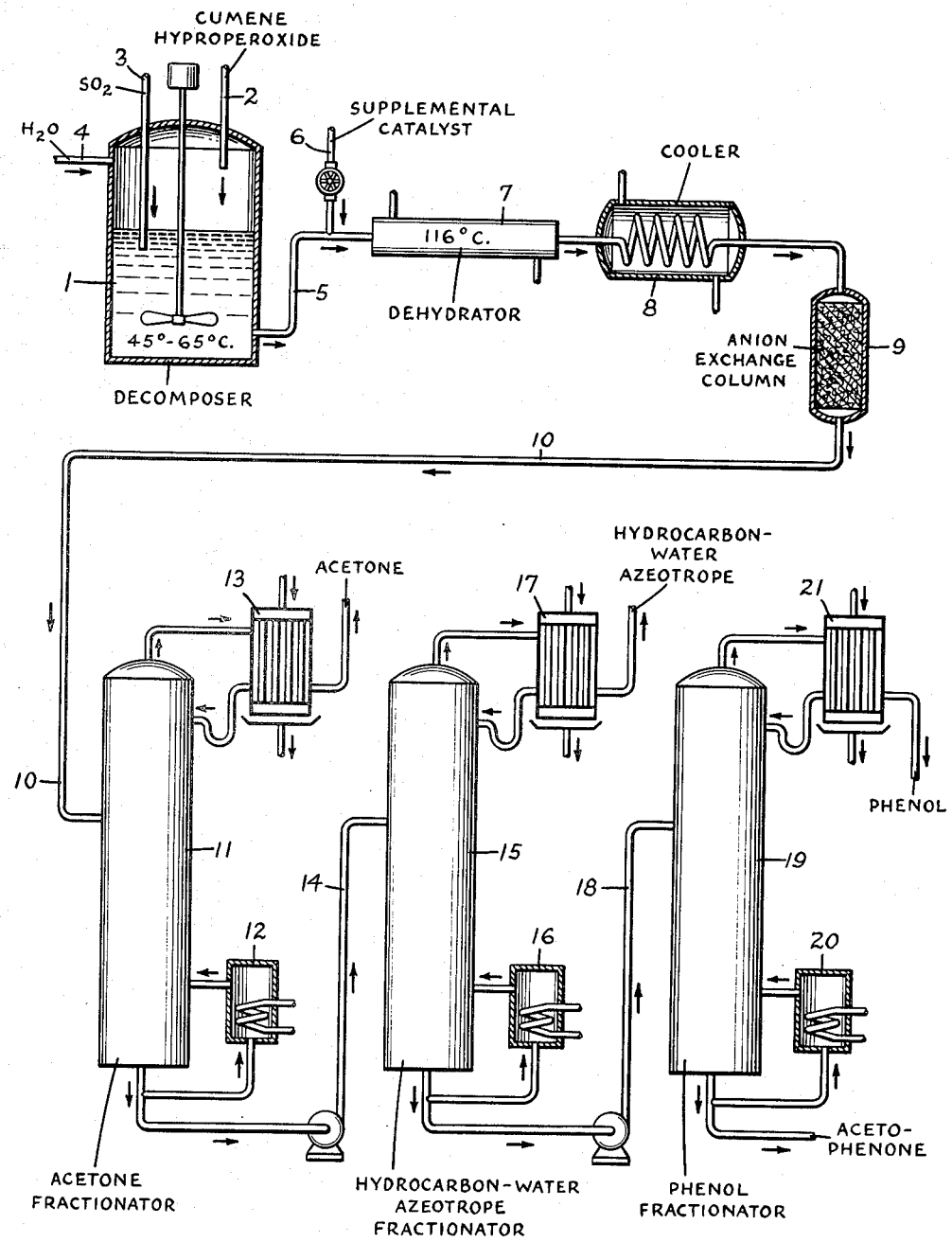

2,757,209

RECOVERY OF PHENOL AND ALPHAMETHYL-STYRENE FROM CUMENE OXIDATION REACTION MIXTURES

George G. Joris, Madison, N. J., assignor to Allied Chemical & Dye Corporation, New York, N. Y., a corporation of New York Application April 26, 1951, Serial No. 223,151

6 Claims. (Cl. 260—621)

This invention relates to treatment of cumene oxidation reaction mixtures to raise the yields of phenol recoverable from such reaction mixtures, and more specifically relates to process of dehydrating, to alpha-methyl-styrene, dimethyl phenyl carbinol impurity in a crude phenol, particularly dimethyl phenyl carbinol by-product in phenolic cumene hydroperoxide decomposition reaction mixtures.

Cumene can be oxidized by controlled oxidation with elemental oxygen, e. g. oxygen of air, to form reaction mixtures containing cumene hydroperoxide, dimethyl phenyl carbinol and acetophenone in varying proportions as the principal oxidation products, together with unreacted cumene. The cumene hydroperoxide component of these reaction mixtures can be decomposed into co-products phenol and acetone and by-products dimethyl phenyl carbinol and acetophenone in proportions depending upon choice of catalyst and other conditions. Operations for production of phenol via elemental oxygen oxidation of cumene accordingly usually result in reaction mixtures containing unreacted cumene, acetone, phenol and greater or lesser amounts of dimethyl phenyl carbinol and acetophenone.

To the extent dimethyl phenyl carbinol is present in the above reaction mixtures, it represents cumene oxidized without production of phenol and accordingly represents lost phenol yield on the basis of cumene oxidized.

Moreover when the above reaction mixtures are distilled to separate the components, presence of dimethyl phenyl carbinol (boiling point 202° C.) reduces the amount of free phenol contained in the reaction mixture, and also complicates recovery of pure phenol (boiling point 182° C.). These effects are apparently due, in the first place, to the fact dimethyl phenyl carbinol tends to react with phenol, in a manner not completely understood, to form paracumyl phenol having the formula

$$p-\text{C}_6\text{H}_5\text{C}(\text{CH}_3)_2\text{C}_6\text{H}_4\text{OH}$$

with corresponding loss from the reaction mixture of free phenol. Furthermore, dimethyl phenyl carbinol undergoes slow dehydration to alpha-methylstyrene by heat and this in turn can dimerize, so that when phenol is fractionated from the above reaction mixtures the phenol cut is contaminated by alpha-methylstyrene formed by dehydration of dimethyl phenyl carbinol and/or by decomposition of cumyl phenol and/or by depolymerization of alpha-methylstyrene dimer.

Advantages of my process outlined below are that by my process, substantially all the dimethyl phenyl carbinol present in cumene oxidation products is converted to a product which is easily separable from the phenol and other components of the above reaction mixtures and which is readily converted back to cumene whereby ultimate yields of phenol, based on cumene oxidized, are correspondingly enhanced. Moreover in accordance with my process, formation of cumyl phenol and alpha-methylstyrene dimer with accompanying complications in phenol recovery can be substantially eliminated. Additionally, the product mixtures obtained in accordance with my process are relatively simple in composition so that they can conveniently be purified by continuous distillation processes.

My process comprises heating for a limited time in liquid phase a dimethyl phenyl carbinol-containing crude phenol product in presence of dimethyl phenyl carbinol dehydration catalyst, and terminating the catalyst action as soon as dehydration to alpha-methylstyrene is substantially complete. Preferably said dehydration is performed upon dimethyl phenyl carbinol in phenolic cumene hydroperoxide decomposition products, substantially free of cumyl phenol and alpha-methylstyrene dimer, obtained as outlined below.

For decomposition in accordance with my process, cumene hydroperoxide is maintained at low concentrations in a liquid reaction medium of cumene hydroperoxide decomposition products preferably containing water, and is heated to decompose it in presence of phenol-forming decomposition catalyst. For dimethyl phenyl carbinol dehydration of the resulting decomposition products containing dimethyl phenyl carbinol and phenol, the products are heated in liquid phase, with or without additional extraneous water and/or additional dimethyl phenyl carbinol dehydration catalyst, until dimethyl phenyl carbinol dehydration is complete or substantially so; and thereupon action of the catalyst is terminated e. g. by removing catalyst. Alpha-methylstyrene and phenol products are then separated.

Preferably decomposition of cumene hydroperoxide is conducted at temperatures in the range between about room temperatures (e. g. 25° C.) and about the atmospheric pressure reflux temperature of the decomposition reaction mixture which is usually about 100° C., and more especially at temperatures of about 45°–65° C. and in presence of a small amount of water such as up to about 10% by weight of the reaction mixture.

Preferably, the dimethyl phenyl carbinol dehydration immediately follows the decomposition step, is at more elevated temperatures than the decomposition step, e. g. at or above 100° C., and is in presence of the same catalyst material as employed for the decomposition, the said catalyst preferably being sulfur dioxide or sulfuric acid, suitably in amounts of the order of 0.001–1% by weight of the cumene oxidation product introduced into the decomposition zone.

Preferably acetone, unreacted cumene, and alpha-methylstryene resulting from the above steps are distilled out of the reaction mixture after removal of the decomposition-dehydration catalyst, in presence of water additional to that formed by dehydration of carbinol. The alpha-methylstyrene can readily be hydrogenated in liquid or vapor phase to cumene thereby completing regeneration of cumene starting material from dimethyl phenyl carbinol oxidation by-product.

The accompanying flow sheet diagrammatically illustrates the process of my invention.

Referring to the flow sheet, 1 is an agitated vessel into which cumene hydroperoxide is introduced via inlet 2; sulfur dioxide, sulfuric acid, or other cumene hydroperoxide decomposition catalyst is introduced suitably through inlet 3; and small amounts of water are preferably introduced through inlet 4. The reaction mixture is periodically or continuously withdrawn, suitably by way of a liquid overflow line 5.

Supplemental catalyst for dehydration of dimethyl phenyl carbinol is added to the decomposition product if desired or necessary, suitably through line 6, and the reaction mixture is passed to a vessel 7 wherein it is heated, preferably to a temperature higher than that in the decomposer, for controlled short periods of time, correlated with temperature and catalyst conditions, effecting substantially complete dehydration of dimethyl phenyl carbinol without prolonged exposure of the resulting reaction mixture to action of the dehydration catalyst.

The reaction mixture withdrawn from dehydrator 7 is suitably cooled in cooler 8 and promptly treated for removal or neutralization of the dehydration catalyst therein, suitably in anionic exchange column 9, wherein acid catalyst is substantially completely removed.

The reaction mixture thus obtained is fractionated, suitably in continuous fractionators 11, 15 and 19 provided with condensers 13, 17 and 21 and reboilers 12, 16 and 20. Acetone is taken off overhead in the first fractionator; the bottoms are pumped via line 14 into the second fractionator wherein a hydrocarbon-water azeotrope containing alpha-methylstyrene is taken overhead; the bottoms are then pumped via line 18 to the third fractionator wherein phenol is taken overhead leaving a residue of acetophenone substantially free of dimethyl phenyl carbinol, cumyl phenol, and alpha-methylstyrene dimer.

The principles governing my process are not completely understood, but apparently its success can be explained on the basis of principles pointed out below, among others.

*Cumene hydroperoxide decomposition*

I have found that under catalyst conditions employed for decomposition of cumene hydroperoxide into phenol and acetone, cumene hydroperoxide is more reactive than is dimethyl phenyl carbinol with phenol to form cumyl phenol. In the decomposition step of my process, accordingly, I avoid undesired cumyl phenol formation by maintaining low cumene hydroperoxide concentrations in the phenol-containing reaction mixture, below a maximum of 25% by weight and preferably not more than about 5% by weight; and at the same time maintaining relatively mild, liquid phase conditions.

Preferably the desired low hydroperoxide concentrations are maintained by feeding hydroperoxide into a decomposer in which the incoming hydroperoxide is diluted with cumene hydroperoxide decomposition products previously formed therein, and from which a reaction mixture with low hydroperoxide concentration is periodically or continuously withdrawn. It has been empirically found that when the decomposition conditions are such that the cumene hydroperoxide concentration in the reaction mixture withdrawn from the decomposer is kept at 2-4 percent by weight substantially no cumyl phenol or alpha-methylstyrene dimer are formed.

When the reaction mixtures are maintained in the decomposer under conditions such that the cumene hydroperoxide concentration in the reaction mixture withdrawn from the reactor is below 1 percent, small amounts of cumyl phenol and alpha-methylstyrene dimer are usually produced. Accordingly I preferably control the concentration of exit hydroperoxide (for example raise it by increasing rate of water or hydroperoxide feed to the decomposer or rate of withdrawal of products or by decreasing rate of sulfur dioxide feed) so that the hydroperoxide concentration in the exit product is about 2-4 per cent by weight.

In accordance with the foregoing, temperatures and catalyst concentrations should be high enough to bring about rapid cumene hydroperoxide decomposition, avoiding build-up of unreacted cumene hydroperoxide, but should nevertheless be kept low enough to avoid unduly promoting the more sluggish cumyl phenol formation from dimethyl phenyl carbinol and phenol, and/or formation of alpha-methylstyrene dimer which is another interfering side-reaction. Preferred temperatures depend to some extent on choice and concentration of catalyst, more active catalysts and higher catalyst concentrations generally accompanying lower temperatures.

Suitable catalyst concentrations using the preferred sulfur dioxide decomposition catalyst are of the order of 0.001-0.2 percent by weight of the reaction mixture. Using catalyst concentrations in the above range, preferred temperatures of decomposition are about 45°-65° C.

I have found that water, even in small amounts such as 2% by weight of the reaction mixture, contributes to inhibiting cumyl phenol and alpha-methylstyrene dimer formation during cumene hydroperoxide decomposition, for reasons not fully understood. Accordingly it is preferred to have some water present during the decomposition step; but water should not be present in excess of preferably about 10% or so by weight of the reaction mixture, since it tends to slow down the cumene hydroperoxide decomposition reaction.

As has been indicated, the influence of temperature, catalyst concentration, and water concentration are interrelated in that increasing either temperature or catalyst concentration tends to counteract any influence of increasing water concentration in causing build-up of undecomposed cumene hydroperoxide; and increasing water concentration tends to counteract any influence of increasing temperature or catalyst concentration in causing excessive formation of cumyl phenol and/or alpha-methylstyrene dimer.

Construction material of the decomposer will sometimes influence the reactions under consideration, e. g. by accelerating cumyl phenol formation, but ordinary materials such as stainless steel can be satisfactorily used.

In accordance with the foregoing, preferred decomposition conditions comprise continuous operation in which incoming hydroperoxide is diluted with earlier formed hydroperoxide decomposition reaction products, sulfur dioxide decomposition catalyst is present in amounts between 50 and 500 parts, especially 100-200 parts, per million parts by weight of reaction mixture; moderate temperatures below about 100° C. are maintained, especially about 45°-65° C.; and water is present, especially about 2-5% by weight of the reaction mixture. Under these conditions cumene hydroperoxide feed is decomposed at a rate such that the cumene hydroperoxide concentration in the reaction mixture withdrawn from the decomposer remains less than 5% but more than 1% by weight.

*Dimethyl phenyl carbinol dehydration*

Dimethyl phenyl carbinol can be catalytically dehydrated in liquid phase to alpha-methylstyrene. I have found that, under the conditions of this invention, in cumene hydroperoxide decomposition-product mixtures this dehydration of dimethyl phenyl carbinol occurs considerably more rapidly than the principal competing reactions which are (a) formation of cumyl phenol from phenol and residual undecomposed cumene hydroperoxide and/or dimethyl phenyl carbinol and/or alpha-methylstyrene, and (b) dimerization of alpha-methylstyrene. Accordingly the catalytic dehydration of dimethyl phenyl carbinol can be carried out without undue interference from competing reactions provided residual cumene hydroperoxide is quickly decomposed and exposure to action of the dehydrating catalyst is not unduly prolonged after dehydration is complete or substantially so.

More particularly, I have found that catalysts of cumene hydroperoxide decomposition to phenol, especially sulfur dioxide and sulfuric acid, are also effective for the above outlined dimethyl phenyl carbinol dehydration in the same or somewhat greater amounts. Accordingly, without separating or neutralizing catalyst present in cumene hydroperoxide decomposition reaction products, these reaction products can be further heated, with or without additional catalyst, best (especially if no catalyst is added) at somewhat higher temperatures than the optimum for decomposing most of the cumene hydroperoxide to phenol, and thereby dimethyl phenyl carbinol can be substantially completely dehydrated to alpha-methylstyrene without interference from other reactions. Residual hydroperoxide is quickly decomposed under such dehydration conditions.

Again as during the decomposition reaction, I have found that water serves to minimize competing reactions as against the desired dehydration. Accordingly any water in the decomposition reaction mixtures is desirably retained, or even augmented up to say 10 percent by weight, for the dehydration step.

Suitable temperatures for dehydration in accordance with my process, in presence of preferred small amounts of catalyst such as 50–2000 p. p. m., are about 75° C. and above, preferably between about 100° C. and the boiling point of the reaction mixture under the working pressure, which can conveniently be up to about 2 atmospheres gauge. At lower temperatures the dehydration may be unduly slow and undesired cumyl phenol and/or alpha-methylstyrene dimer formation may begin to appear.

Reaction times are suitably up to about 45 minutes, preferably less than 30 minutes, e. g. 10 minutes or less. As previously noted, the reaction time should be correlated with the dehydration temperature and catalyst conditions to assure substantial completion of dehydration without prolonged exposure of the resulting reaction mixture to action of the dehydration catalyst. Using preferred temperatures of about 110°–120° C., reaction times will usually be about 5–15 minutes.

Catalyst removal

I have found that in total absence of cumene hydroperoxide decomposition-dimethyl phenyl carbinol dehydration catalyst the reaction mixtures resulting from the above operations, containing alpha-methylstyrene and phenol, can be heated to distil out alpha-methylstyrene and other ingredients without significant condensation occurring to form cumyl phenol and without dimerization of alpha-methylstyrene occurring. Moreover I have found that if only traces of catalyst remain in the reaction mixture, distillation of alpha-methylstyrene can still be carried out without cumyl phenol or alpha-methylstyrene dimer formation in presence of a few percent by weight of water.

Accordingly after the dimethyl phenyl carbinol dehydration step is over, the dehydration catalyst should be substantially completely removed or substantially neutralized. For example, an acid catalyst can be substantially completely removed by use of an anion exchange resin or can be neutralized with a base. Difficulty with the distillation apparatus due to introduction therein of salts formed by reaction of the catalyst with a base can be avoided by use of resin to remove catalyst, and accordingly use of such anion exchange resin is preferred.

Cooling the above reaction mixtures to room temperatures is insufficient, in presence of catalyst, to prevent slow cumyl phenol formation; but these reaction mixtures can be preserved without change under refrigeration.

Product separation

A convenient method of separating the alpha-methylstyrene and phenol ingredients of the product mixture obtained in accordance with the foregoing is to fractionate the product mixture, e. g. at reduced pressures. As before, presence of water in amounts such as 2–10% by weight may be desirable, especially if traces of catalyst remain present, until alpha-methylstyrene which can react with phenol to form cumyl phenol has been eliminated (as azeotrope with water) from the distilland. With catalyst completely removed, presence of water and use of reduced pressures are not essential: anhydrous alpha-methylstyrene can be satisfactorily distilled from phenol in absence of the above catalysts without substantial cumyl phenol formation.

The acetone ingredient of the cumene hydroperoxide decomposition reaction mixture can be distilled out prior to the dimethyl phenyl carbinol dehydration treatment but preferably is distilled out after the dehydration, suitably at atmospheric pressure. Alpha-methylstyrene and unreacted cumene are then removed preferably as their aqueous azeotropes. Both these distillations are suitably in continuous distillation apparatus. The acetone distillation and dimethyl phenyl carbinol dehydration and/or catalyst neutralization or removal can be carried on simultaneously or in overlapping relation so long as the reaction mixture is not exposed to action of the dehydration catalyst for any prolonged period after dehydration is complete.

Thus the separation of products of my process is relatively simple, giving a first fraction of acetone, a second fraction of cumene-alpha-methylstyrene-water azeotropes, and residue of substantially only the two components phenol and acetophenone which are readily separable by fractionation, e. g. at reduced pressures such as 40 mms. Hg. By hydrogenation, the alpha-methylstyrene can be converted to cumene for reuse so that separation of these two materials, while relatively simple, is not required.

The examples which follow are illustrative of my invention but are not intended to limit the same.

Example 1

Crude cumene hydroperoxide obtained by air oxidation of cumene followed by evaporation of most of the unreacted cumene, containing about 85% by weight of cumene hydroperoxide, about 10% by weight of unreacted cumene, and about 5% by weight of oxidation by-product mostly dimethyl phenyl carbinol and acetophenone was subjected to decomposition by continuously running it into a stirred body of previously decomposed hydroperoxide in a stainless steel tank at about 60° C. and with one hour hold-up time together with about 2% by weight of water and about 100 parts by weight of sulfur dioxide per million parts of crude cumene hydroperoxide introduced into the decomposer. The decomposition product mixture, continuously withdrawn from the bottom of the tank, contained principally phenol and acetone together with 2–4 percent by weight of undecomposed cumene hydroperoxide, unreacted cumene, dimethyl phenyl carbinol and acetophenone. Under the decomposition conditions employed, substantially no cumyl phenol or alpha-methylstyrene dimer was formed.

About 0.25 percent by weight of normal aqueous sulfuric acid (i. e. about 250 parts of acid per million parts by weight of the reaction mixture) was added to the above decomposition products and the products were heated at 80° C. for about 30 minutes. At the end of this time substantially all the dimethyl phenyl carbinol had been converted to alpha-methylstyrene and substantially no cumyl phenol or alpha-methylstyrene dimer had been formed.

The products were allowed to cool and were neutralized with sodium carbonate. The resulting products were distilled to separate acetone, cumene-alpha-methyl-styrene-water azeotrope and phenol, leaving acetophenone as residue.

Like operations were carried out with the modification that the decomposition products were neutralized and acetone was distilled off before addition of sulfuric acid dehydrating catalyst. This method of procedure gives similar results to the preceding but requires two neutralization steps.

Analysis for carbinol, alpha-methylstyrene, cumyl phenol and alpha-methylstyrene dimer in the above distillates and residues was by infra red absorption technique.

Example 2

A crude cumene hydroperoxide obtained by air oxidation of cumene followed by evaporation of unreacted cumene, and containing on the average about 84% by weight of cumene hydroperoxide, about 11 percent by weight of unreacted cumene and about 5% by weight of oxidation by-products mostly dimethyl phenyl carbinol and acetophenone, was continuously decomposed as in the preceding example in presence of about 125 parts of added sulfur dioxide, per million parts by weight of crude hydroperoxide, and 3.5% by weight of water. The decomposition products contained chiefly phenol and acetone, together with 2–4 weight percent undecomposed cumene hydroperoxide, and the balance largely unreacted cumene, dimethyl phenyl carbinol, and acetophenone with traces of other substances. Substantially no cumyl phenol or alpha-methylstyrene dimer was formed under the conditions of decomposition.

The decomposition products were passed continuously through a ½ inch diameter, 4 foot long stainless steel tube, heated at 116°±1° C., with hold-up time of about 5 minutes. Under these conditions substantially all of the residual hydroperoxide was decomposed and substantially all of the dimethyl phenyl carbinol in the products was dehydrated to alpha-methylstyrene without substantial formation of cumyl phenol or alpha-methyl-styrene dimer.

I have indicated herein that sulfur dioxide is catalyst of cumene hydroperoxide decomposition and of dimethyl phenyl carbinol dehydration. It should be noted that traces of aldehydes are present in my oxidation products and that sulfur dioxide may combine with these aldehydes, specifically acetaldehyde in situ under the reaction conditions. Accordingly the term "sulfur dioxide catalyst" as used herein should be understood to include sulfur dioxide reaction products which can be formed in situ under the above reaction conditions.

The products of the dehydration step were cooled and passed at space velocity of about 10 per hour through a small column packed with a weak-base resinous anion exchanger, the specific material being that commercially available under the trade name "Amberlite IR–4B." This treatment removed sulfur dioxide, probably in the form of a strongly acidic addition product with aldehyde formed in trace amounts by the operations above described.

The products from which catalyst had thus been removed were distilled in a continuous still to separate an acetone cut, with the residue passing to a continuous still in which cumene-alpha-methylstyrene-water azeotrope was separated and from which the remaining phenol and acetophenone passed to a continuous still in which phenol was separated.

The crude phenol was purified by redistillation. The recovery of pure phenol from the decomposition product was 95% of theory.

Any residual phenol accompanying the acetophenone residue can be largely separated therefrom by extraction with water or aqueous alkaline solution, suitably at elevated temperatures.

Alpha-methylstyrene was separated from cumene in the hydrocarbon layer of the aqueous azeotrope by redistillation and hydrogenated to cumene, in practically quantitative yield. Water from this azeotrope was recycled to the decomposer.

Completeness of the dimethyl phenyl carbinol dehydration step can be determined by appropriate analysis of samples taken from the dehydrator, e. g. by distilling samples and analyzing the residue spectroscopically for dimethyl phenyl carbinol. If the dehydration is found to be incomplete the product can be returned to the dehydrator for further treatment therein to complete the dehydration. The residue can also be analyzed for cumyl phenol and alpha-methylstyrene dimer; and if these have been formed in substantial quantities the conditions of dehydration can be modified as above outlined to avoid formation of these by-products.

I claim:

1. Process which comprises heating for a limited time in liquid phase a dimethyl phenyl carbinol-containing crude phenol, containing only minor proportions of compounds boiling higher than phenol, in presence of dimethyl phenyl carbinol dehydration catalyst and terminating action of said catalyst as soon as dehydration of said dimethyl phenyl carbinol is substantially complete, whereby dimethyl phenyl carbinol in the crude phenol is converted to alpha-methylstyrene as the major organic product of said heating operation.

2. Process as defined in claim 1 wherein the crude phenol is a cumene hydroperoxide decomposition product.

3. Process as defined in claim 2 wherein the dehydration catalyst is at least one material of the group consisting of sulfur dioxide and sulfuric acid.

4. Process for obtaining phenol from cumene hydroperoxide which comprises forming a reaction mixture by feeding cumene hydroperoxide into a decomposer in which the incoming hydroperoxide is diluted by cumene hydroperoxide decomposition products previously formed therein, maintaining said reaction mixture at temperatures in the range from about 45° C. to about 65° C., feeding into the decomposer sulfur dioxide in quantities in the range from about 50 to about 500 parts per million parts by weight of the cumene hydroperoxide feed, and feeding into the decomposer water in quantities in the range from about 2 percent to about 5 percent by weight of the reaction mixture; withdrawing reaction mixture from the decomposer at cumene hydroperoxide concentrations of about 1–5 percent by weight; under the conditions defined in claim 5, heating the withdrawn decomposition product mixture and removing dehydration catalyst from the resulting product; and fractionating the resulting organic products into an acetone fraction, a hydrocarbon-water azeotrope fraction containing alpha-methylstyrene, a phenol fraction, and acetophenone residue substantially free of dimethyl phenyl carbinol, cumyl phenol, and alpha-methylstyrene dimer.

5. Process which comprises heating for a limited time in liquid phase a crude phenol, resulting from cumene hydroperoxide decomposition and containing dimethyl phenyl carbinol, in presence of at least one material of the group consisting of sulfur dioxide and sulfuric acid dehydration catalysts of dimethyl phenyl carbinol, and in presence of water additional to that formed by carbinol dehydration in quantities not above about 10% by weight, said dehydration catalyst being present in quantities of the order of 0.001–1% by weight of the dehydration reaction mixture; and terminating action of said catalyst as soon as dehydration is substantially complete, whereby dimethyl phenyl carbinol is converted to alpha-methylstyrene as the major organic product of said heating operation.

6. Process as defined in claim 5 wherein quantities of water in the dehydration reaction mixture are in the range from about 2 percent to about 5 percent by weight, the catalyst is sulfur dioxide in quantities in the range from about 50 to about 2000 parts per million parts by weight of reaction mixture, dehydration temperatures are in the range from about 100° C. to the boiling point of the reaction mixture at pressure of 2 atmospheres gauge, and dehydration catalyst is removed by contacting the dehydration product mixture with anion exchange resin.

References Cited in the file of this patent
UNITED STATES PATENTS

| | | |
|---|---|---|
| 1,938,827 | Gibbons et al. | Dec. 12, 1933 |
| 2,189,771 | Smith | Feb. 13, 1940 |
| 2,223,383 | Moyer et al. | Dec. 3, 1940 |
| 2,321,551 | Loder | June 8, 1943 |
| 2,527,640 | Lorand et al. | Oct. 31, 1950 |
| 2,548,435 | Lorand et al. | Apr. 10, 1951 |

FOREIGN PATENTS

| | | |
|---|---|---|
| 629,429 | Great Britain | Sept. 20, 1949 |
| 496,061 | Belgium | June 15, 1950 |
| 670,444 | Great Britain | Apr. 16, 1952 |

OTHER REFERENCES

Mowry et al., Jour. Amer. Chem. Soc., vol. 68 (1946), pgs. 1105–9.